(12) United States Patent
Toia et al.

(10) Patent No.: US 8,081,417 B2
(45) Date of Patent: *Dec. 20, 2011

(54) ELECTROLYTIC CAPACITOR COMPRISING MEANS FOR THE SORPTION OF HARMFUL SUBSTANCES

(75) Inventors: Luca Toia, Carnago (IT); Marco Amiotti, Cornaredo (IT)

(73) Assignee: Saes Getters S.p.A., Lainate MI (IT)

( * ) Notice: Subject to any disclaimer, the term of this patent is extended or adjusted under 35 U.S.C. 154(b) by 747 days.

This patent is subject to a terminal disclaimer.

(21) Appl. No.: 12/094,908

(22) PCT Filed: Nov. 30, 2006

(86) PCT No.: PCT/IT2006/000830
§ 371 (c)(1),
(2), (4) Date: May 23, 2008

(87) PCT Pub. No.: WO2007/080614
PCT Pub. Date: Jul. 19, 2007

(65) Prior Publication Data
US 2008/0310079 A1     Dec. 18, 2008

(30) Foreign Application Priority Data
Jan. 16, 2006   (IT) ............................. MI2006A0056

(51) Int. Cl.
*H01G 9/00* (2006.01)

(52) U.S. Cl. ........ 361/523; 361/516; 361/517; 361/525; 361/528; 361/529

(58) Field of Classification Search ............... 361/523, 361/516–519, 525, 528–529, 509–512, 503–504
See application file for complete search history.

(56) References Cited

U.S. PATENT DOCUMENTS

| | | |
|---|---|---|
| 3,331,002 A | 7/1967 | Everitt |
| 3,491,269 A | 1/1970 | Booe |
| 4,312,669 A | 1/1982 | Boffito et al. |
| 4,830,643 A | 5/1989 | Sassa |
| 5,743,942 A | 4/1998 | Shelley et al. |
| 5,961,750 A | 10/1999 | Boffito et al. |
| 6,428,612 B1 | 8/2002 | McPhilmy et al. |
| 6,765,784 B2 * | 7/2004 | Ohya et al. ................ 361/523 |
| 6,881,232 B2 * | 4/2005 | O'Phelan et al. ........... 29/25.03 |
| 7,385,802 B1 * | 6/2008 | Ribble et al. ............... 361/508 |
| 7,663,865 B2 * | 2/2010 | Toia et al. .................. 361/523 |
| 2010/0173192 A1 * | 7/2010 | Toia et al. .................. 429/164 |

FOREIGN PATENT DOCUMENTS

| | | |
|---|---|---|
| GB | 979024 | 1/1965 |
| JP | 3292712 A | 12/1991 |
| JP | 2003197487 A | 7/2003 |
| WO | 2006123389 A1 | 11/2006 |

* cited by examiner

*Primary Examiner* — Nguyen T Ha
(74) *Attorney, Agent, or Firm* — Panitch Schwarze Belisario & Nadel LLP

(57) ABSTRACT

An electrolytic capacitor is provided having an airtight casing, electrodes immersed in an electrolytic solution, electrical contacts connected to the electrodes, and a means (10, 43) for sorption of harmful substances. The means for sorption of harmful substances includes a polymeric housing (11, 12) permeable to the harmful substances but impermeable to the electrolytic solution and contain one or more getter materials (14, 45) for sorption of the harmful substances.

27 Claims, 3 Drawing Sheets

ELECTROLYTIC CAPACITOR COMPRISING MEANS FOR THE SORPTION OF HARMFUL SUBSTANCES

CROSS-REFERENCE TO RELATED APPLICATIONS

This application is a Section 371 of International Application No. PCT/IT2006/000830, filed Nov. 30, 2006, which was published in the English language on Jul. 19, 2007, under International Publication No. WO 2007/080614 A1, and the disclosure of which is incorporated herein by reference.

BACKGROUND OF THE INVENTION

The present invention relates to electrolytic capacitors containing means able to sorb the harmful substances created by such capacitors during their operation.

Known electrolytic capacitors, e.g. EDLC (Electrochemical Double Layer Capacitor) super-capacitors, are essentially comprised of an airtight casing, wherein electrodes typically formed of metal sheets are arranged, the electrodes being immersed in particular electrolytic solutions. The casing also contains elements having a gettering action for the sorption of harmful substances, and electrical contacts communicating the electrodes with the outside of the capacitor.

As to the electrolytic solutions, they are typically formed of a solvent and an ionic salt. In the case of EDLCs, for example, acetonitrile and propylene carbonate are often used as solvents, while tetraethyl-ammonium-tetrafluoroborate is often used as a salt.

During the operation of the capacitor, these solutions can create harmful substances, often in gaseous form, which can damage the capacitors even in an irreparable manner. Another possible source of harmful gases can be due to the desorption of some materials used inside the capacitor.

Carbon dioxide, carbon oxide and hydrogen are among the most harmful gaseous species; while water, which is another species being particularly harmful, is typically present in liquid form in the electrolytic solution.

The problem of sorption of harmful species inside the capacitors can be tackled by adding one or more sorbing elements mixed in the electrolytic solution, or by non-mixed sorbing systems. The use of materials with a gettering action being mixed in the electrolyte can be accomplished by liquid sorbers. Such type of solution is disclosed in International patent application PCT/IT2006/000349 of SAES Getters S.p.A. A second embodiment prescribes the use of solid sorbers being added to the electrolyte, as described in Japanese patent application publication JP 03-292712, wherein an additive including a particulate of platinum, palladium or alloys thereof is applied onto the sheets after these have been impregnated with the electrolytic solution. However, these sheets may have a very small thickness, in particular less than 10 micrometers ($\mu m$), whereby they may be damaged by the particles contained in such a particulate, due to their relatively large diameter, resulting in the risk of accidental short-circuits within the capacitor.

A system employing gas sorbers placed in delimited regions of the capacitor is described in Japanese patent application publication JP 2003-197487. In this case, the sorbing material is used in the form of sheets made of a polymeric material, such as polypropylene, supporting the sorbing material, such sheets being directly in contact with the electrolytic solution.

These types of solution are limited by the fact that the sorbing material, in addition to have the function of sorbing the harmful substances produced within the capacitor, must be compatible with the electrolyte, i.e., it must be completely inert with respect thereto, in order to prevent its sorbing properties from being jeopardized, or, even worse, that chemical species harmful for the correct operation of the capacitor are released as an effect of the reaction with the electrolyte. For instance, the possible decomposition of the gas sorber could vary the electric conductivity of the electrolyte. Such a chemical compatibility must be ensured by the sorber, even after the sorber has carried out its function by binding with the harmful species.

BRIEF SUMMARY OF THE INVENTION

In a first aspect thereof, the present invention relates to an electrolytic capacitor being able to overcome the problems still present in the prior art. In particular, this aspect includes an electrolytic capacitor comprising an airtight casing containing an electrolytic solution in which electrodes are immersed, electrical contacts connected to the electrodes, and means in the casing for sorption of harmful substances, characterized in that the means for sorption of harmful substances comprises a polymeric housing which is permeable to the harmful substances but impermeable to the electrolyte and contains one or more getter materials for sorption of the harmful substances.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

Figure 1:
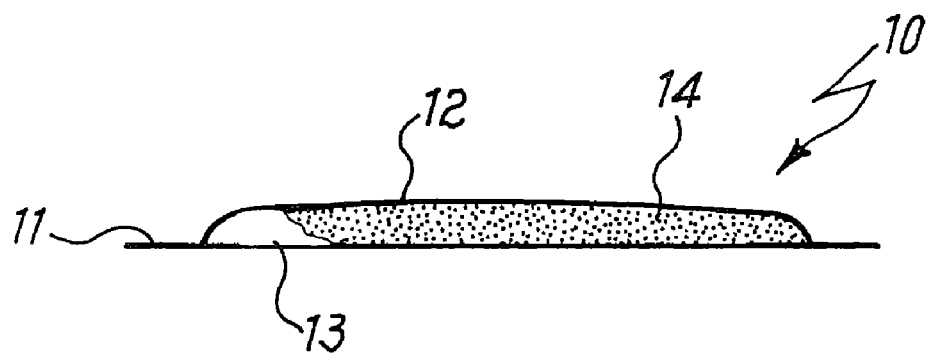
FIG. 1 is a partially broken away view of a means for sorption of harmful substances in electrolytic capacitors according to one embodiment of the present invention.

The size and size ratios of the various elements shown in the drawings are not correct, having been altered in order to facilitate an understanding of the drawings.

DETAILED DESCRIPTION OF THE INVENTION

FIG. 1 shows in a partially broken away view a means 10 for sorption of harmful substances, the means comprising two polymeric sheets 11 and 12 welded to each other at their periphery, thus defining a cavity 13 containing powders 14 of one or more getter materials. At least one and preferably both the materials forming the polymeric sheets 11 and 12 are permeable to harmful substances but impermeable to the electrolyte, thus exerting a protective action with respect to the getter material. This allows a free choice of getter material, regardless of the type of electrolyte used inside the capacitor.

The thickness of the polymeric sheets 11 and 12 is a very important parameter for the invention, as it is necessary that these sheets be thin in order to allow an effective permeation of the harmful substances, but at the same time they must be thick enough to avoid breaking and the consequent leakage of the getter material. As a result of these opposing requirements, it has been found that the thickness of the polymeric sheets is suitably between 2 and 50 µm, and preferably between 5 and 15 µm. In a preferred embodiment the two polymeric sheets have the same thickness.

Of course, means for sorption of harmful substances with a structure equivalent to that described with reference to FIG. 1 could likewise be obtained by using a single polymeric sheet, folded over itself along one line to form one side of the means and welded along the other edge or edges to form a closed cavity analogous to cavity 13. This arrangement also satisfies the preferred choices, described above, that the sheets 11 and 12 have the same thickness and characteristics of permeability.

In the case in which the getter system is installed along one of the internal walls of the electrolytic capacitor, it is possible to use a greater thickness for the sheet contacting such a wall, as along the contact surface between the getter system and the capacitor wall there is no permeation of harmful substances.

The getter materials contained in the polymeric housing are preferably in the form of powders, with grain size less than 60 µm. It is also possible that the getter material be used in the form of pills made of compressed powders only. Such a solution is useful when a greater amount of getter material must be introduced into the electrolytic capacitor.

Figure 2:
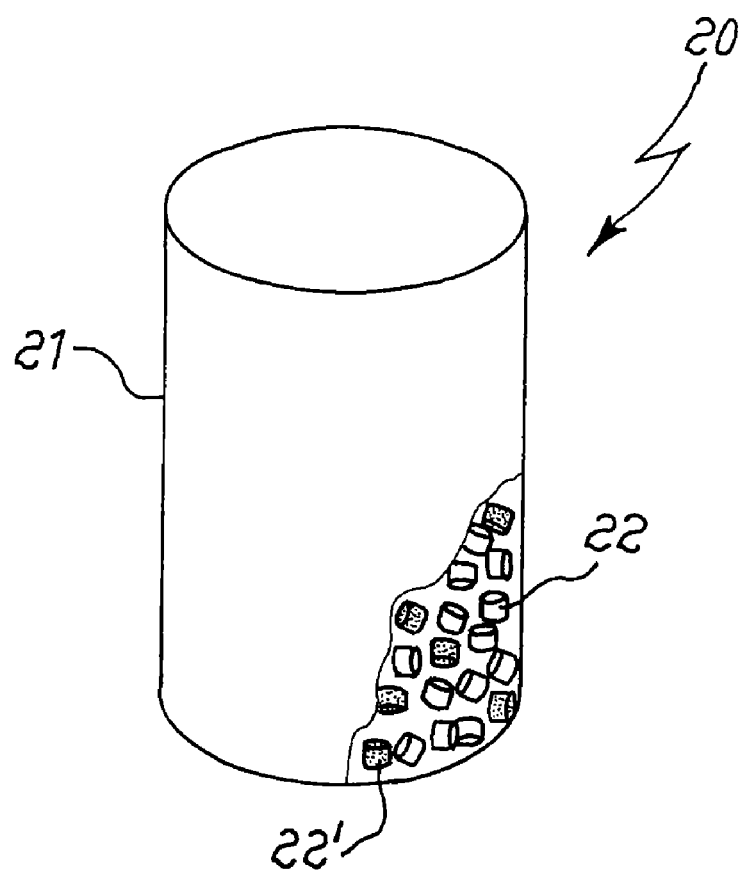
FIG. 2 is a perspective view, partially broken away, of another embodiment of a means for sorption of harmful substances in electrolytic capacitors of the invention.

FIG. 2 shows a system 20 for sorption of harmful substances, wherein two different getter materials, 22 and 22' are introduced in the form of pills enclosed in a cylindrical housing 21 made of polymeric material permeable to harmful substances.

Getter materials in permeable polymeric housings used in other applications and in other fields are known and described, for example, in U.S. Pat. Nos. 4,830,643; 5,743,942 and 6,428,612.

As to the materials forming the permeable polymeric housing, the inventors have found that polytetrafluoroethylene (PTFE) and polyolefins are suitable materials for the accomplishment of the invention. As to polyolefins, preferred is polyethylene, particularly low-density polyethylene (LDPE).

The getter materials used in the means according to the invention are of various kinds, depending on the harmful substances to be removed from the inside of the capacitor. The nature of these substances may be ascertained, for any kind of capacitor, by preliminary tests carried out analyzing the gas developed during operation by different types of capacitors without any means for removing gases.

When the harmful substance is hydrogen, it is possible to use non-evaporable getter alloys, particularly the zirconium-vanadium-iron alloys described in U.S. Pat. No. 4,312,669 and sold by SAES Getters S.p.A. under the trademark St 707, or the zirconium-cobalt-Rare Earth alloys described in U.S. Pat. No. 5,961,750 and sold by SAES Getters S.p.A. under the trademark St 787. It is also possible to use unsaturated organic compounds (possibly along with hydrogenation catalysts), zeolites with a silver deposit or carbon nanotubes. Finally, it is possible to use materials that react with hydrogen forming water, such as palladium oxide (PdO) or cobalt(II,III) oxide ($Co_3O_4$), in combination with $H_2O$ sorbers.

In case the harmful substance is $H_2O$, it is possible to use as getter materials alkaline earth metals oxides (preferred is calcium oxide), boron oxide or zeolites.

In case the harmful substance is carbon dioxide, $CO_2$, suitable getter materials are lithium hydroxide, alkaline-earth metal hydroxides, or lithium salts such as $LiXO_y$, where X is selected from zirconium, iron, nickel, titanium, and silicon, and y is between 2 and 4.

In case the harmful substance is carbon monoxide, CO, it is possible to use the cobalt(II,III) oxide ($CO_3O_4$), copper(II) oxide (CuO), or potassium permanganate ($KMnO_4$), preferably along with a $CO_2$ sorber.

The means for sorption of harmful substances for use in the electrolytic capacitors of the present invention may also include more than one getter material, depending on the harmful substances needed to be removed from the capacitor. For example, in capacitors where the solvent is acetonitrile, hydrogen production mainly occurs, whereby it is advisable to use a composition with more getter material for such a gas, whereas in the case where the solvent is propylene carbonate, a larger amount of powder must be used to sorb CO and $CO_2$.

Figure 3:
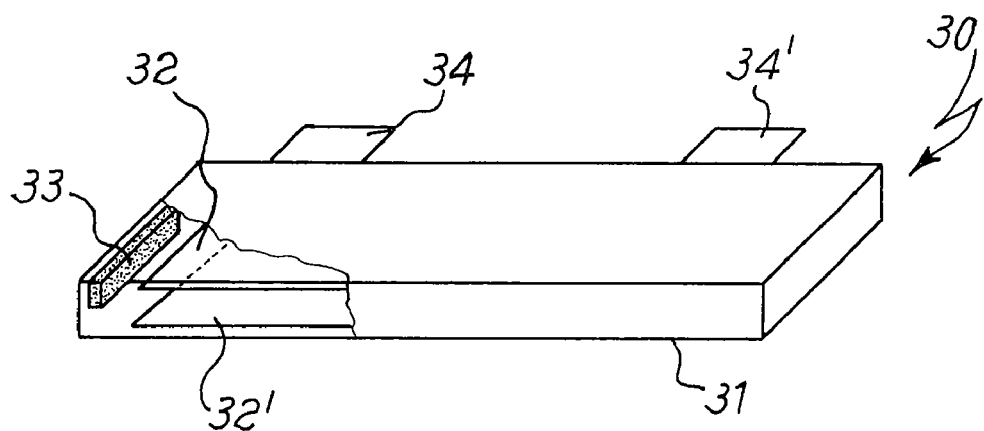
FIG. 3 is a perspective view, partially broken away, of an electrolytic capacitor comprising a permeable polymeric housing containing getter materials.

The electrolytic capacitors of the present invention can be manufactured by placing the permeable housing containing the getter material along one side of the electrolytic capacitor, in a region of the capacitor free from electrodes, as shown, for example, in FIG. 3. In this case the structure of the electrolytic capacitor 30 comprises a plurality of planar electrodes (only the outermost two, 32 and 32', are shown in the drawing in order not to jeopardize its readability) in the form of parallel metal plates immersed in the electrolytic solution (not shown). The permeable polymeric housing 33, containing the getter material for the sorption of harmful gases, is arranged on one side of this capacitor. The electrical contacts 34 and 34' communicate the electrodes with the outside of the airtight casing 31 of the electrolytic capacitor.

FIG. 3 shows a preferred embodiment for an electrolytic capacitor 30. Alternative and completely equivalent embodiments prescribe the use of one or more permeable polymeric housings arranged along portions of the internal walls of the airtight casing of the electrolytic capacitor.

Figure 4:
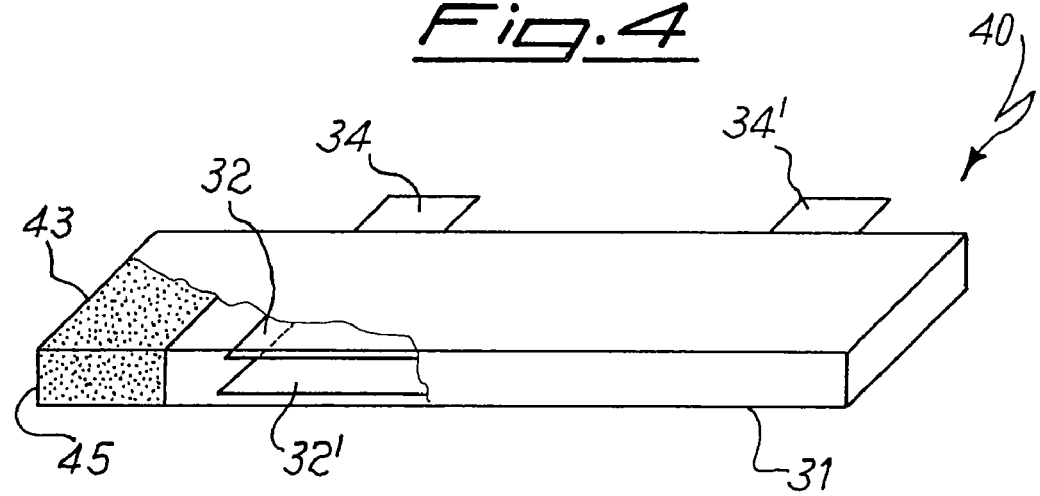
FIG. 4 is a perspective view, partially broken away, of an alternative embodiment of the electrolytic capacitor shown in FIG. 3.

FIG. 4 shows an electrolytic capacitor 40 similar to the one described with reference to FIG. 3 (elements in FIG. 4 having the same numerals of FIG. 3 are the same as described above), but wherein a portion 43 is added to the capacitor structure with the aim of containing the getter means 45 for sorption of harmful substances. Actually, portion 43 containing the getter means forms a portion of the airtight casing of the electrolytic capacitor, free from its elements (electrodes, contacts) but communicating along one side with the inside of the electrolytic capacitor. If the permeable polymeric housing does not occupy the whole available volume of the portion 43, a part of this volume is filled with the electrolyte.

Figure 5:
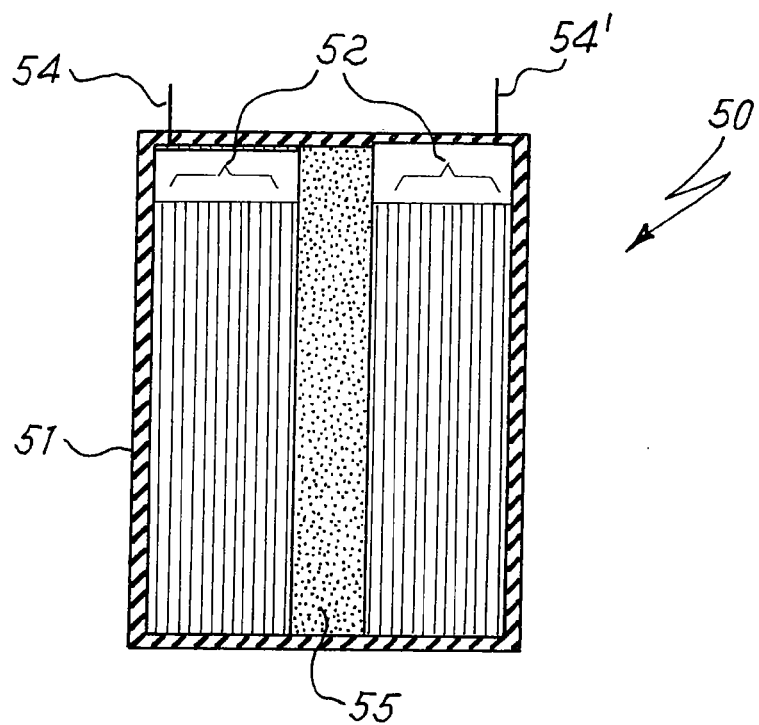
FIG. 5 is a cross-sectional side view of another embodiment of an electrolytic capacitor having a different geometry, comprising a permeable polymeric housing containing getter materials.

Alternatively, the permeable housing containing the getter material may be inserted into the central portion of the electrolytic capacitor, as shown, for instance, in FIG. 5. In this case, the capacitor 50 has a cylindrical geometry, and an axial cross-sectional view thereof is shown. The capacitor comprises an airtight casing 51 containing the electrodes 52 in the form of thin sheets coiled to form a spiral, the cross-sectional view of which is represented by parallel lines vertically close to each other, immersed in a liquid electrolyte (not shown). Electrical contacts 54, 54' communicate the electrodes with the outside of the airtight casing (in FIG. 5, for clarity reasons, the contacts have been drawn as separate elements with respect to the electrodes). The means for sorption of harmful substances 55, namely a permeable polymeric housing containing the getter material, is located in the central portion of this capacitor.

Figure 6:
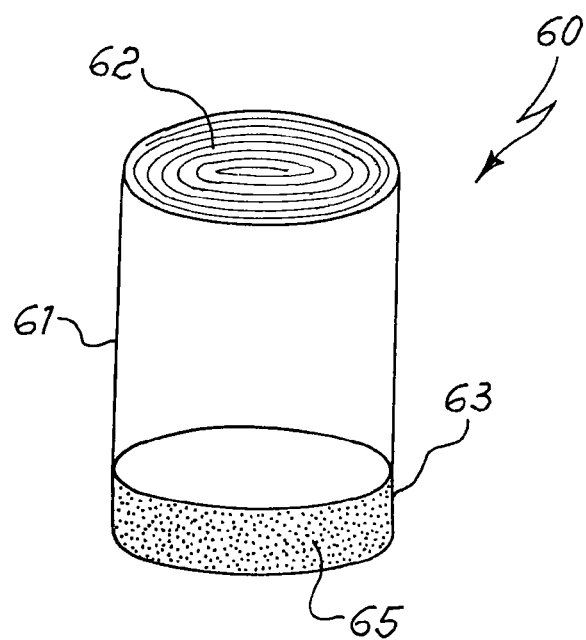
FIG. 6 is a cross-sectional perspective view of a preferred embodiment of the electrolytic capacitor shown in FIG. 5.

Another preferred embodiment of the invention is shown in FIG. 6. In this case, the electrolytic capacitor 60 still has a cylindrical geometry and contains electrodes in the form of spiral coil 62. The airtight casing 61 has a portion 63 in its lower part that serves to host the means 65 for sorption of harmful substances, again in the form of a permeable polymeric housing containing the getter material. Such an embodiment is particularly advantageous, as there are no particular geometric constraints due to the proximity of the means for the sorption of harmful substances to the electrical contacts.

In the embodiments shown in FIGS. 4 and 6, it is advisable to add a separation grid (not shown) between the region hosting the permeable polymeric housing and the electrodes, in order to prevent these latter from damaging the polymeric housing, which could cause the leakage of the getter material contained therein. Such a grid must be electrically insulating, because being in contact with the different electrodes, it must not result in short-circuits among them.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An electrolytic capacitor (30; 40; 50; 60) comprising an airtight casing (31; 51; 61), electrodes (32, 32'; 52; 62) immersed in an electrolytic solution, electrical contacts (34, 34'; 54, 54') connected to the electrodes, and means (10; 20; 33; 45; 55; 65) for sorption of harmful substances, wherein the means for sorption of harmful substances comprises a polymeric housing (21) permeable to the harmful substances but impermeable to the electrolytic solution and containing at least one getter material (14; 22, 22') for sorption of the harmful substances.

2. The electrolytic capacitor according to claim 1, wherein the permeable polymeric housing comprises two welded polymeric sheets (11, 12).

3. The electrolytic capacitor according to claim 2, wherein of the polymeric sheets have a thickness between 2 and 50 μm.

4. The electrolytic capacitor according to claim 3, wherein the thickness is between 5 and 15 μm.

5. The electrolytic capacitor according to claim 2, wherein the polymeric sheets have a same thickness.

6. The electrolytic capacitor according to claim 1, wherein the permeable polymeric housing comprises one polymeric sheet, folded over itself along one line to form one side of the means and welded along at least one edge to form a closed cavity.

7. The electrolytic capacitor according to claim 1, wherein the at least one getter material has a form of a powder having a grain size less than 60 μm.

8. The electrolytic capacitor according to claim 7, wherein the powder is compressed to form pills.

9. The electrolytic capacitor according to claim 1, wherein the polymeric housing (21) has a cylindrical shape.

10. The electrolytic capacitor according to claim 1, wherein the permeable polymeric housing comprise a polyolefin.

11. The electrolytic capacitor according to claim 10, wherein the polyolefin is low-density polyethylene (LDPE).

12. The electrolytic capacitor according to claim 1, wherein the permeable polymeric housing comprises polytetrafluoroethylene (PTFE).

13. The electrolytic capacitor according to claim 1, wherein the harmful substances comprise hydrogen, and the at least one getter material comprises non-evaporable getter alloys.

14. The electrolytic capacitor according to claim 13, wherein the non-evaporable getter alloys are selected from zirconium-vanadium-iron alloys and zirconium-cobalt-Rare Earth alloys.

15. The electrolytic capacitor according to claim 1, wherein the harmful substances comprise hydrogen, and the at least one getter material comprises unsaturated organic compounds.

16. The electrolytic capacitor according to claim 15, further comprising a hydrogenation catalyst.

17. The electrolytic capacitor according to claim 1, wherein the harmful substances comprise hydrogen, and the at least one getter material is selected from carbon nanotubes and zeolites with a silver deposit.

18. The electrolytic capacitor according to claim 1, wherein the harmful substances comprise hydrogen, and the at least one getter material comprises at least one compound selected from palladium oxide and cobalt(II,III) oxide.

19. The electrolytic capacitor according to claim 18, wherein the at least one getter material is used together with a getter material for removal of H2O.

20. The electrolytic capacitor according to claim 1, wherein the harmful substances comprise H2O, and the at least one getter material comprises at least one compound selected from alkaline-earth metals oxides, boron oxide and zeolites.

21. The electrolytic capacitor according to claim 20, wherein the alkaline-earth metal oxide comprises calcium oxide.

22. The electrolytic capacitor according to claim 1, wherein the harmful substances comprise CO2, and the at least one getter material comprises at least one compound selected from lithium hydroxide, alkaline-earth metal hydroxides, and lithium salts of formula LiXOy, where X is selected from zirconium, iron, nickel, titanium, and silicon, and y is between 2 and 4.

23. The electrolytic capacitor according to claim 1, wherein the harmful substances comprise CO, and the at least one getter material comprises at least one compounds selected from cobalt(II,III) oxide, copper(II) oxide, and potassium permanganate.

24. The electrolytic capacitor according to claim 23, wherein the at least one getter material is used together with a getter material for removal of CO2.

25. The electrolytic capacitor according to claim 1, comprising at least one polymeric housing containing at least one getter material, and the at least one polymeric housing is arranged along at least one portion of an inner wall of the airtight casing.

26. The electrolytic capacitor according to claim 1, wherein a portion of the airtight casing is devoted to hosting the polymeric housing comprising the at least one getter material.

27. The electrolytic capacitor according to claim 26, wherein the portion for hosting the polymeric housing comprising the at least one getter material is separated from a residual portion of the electrolytic capacitor by an electrically insulating grid.

* * * * *